US012157151B2

(12) United States Patent
Domeracki

(10) Patent No.: US 12,157,151 B2
(45) Date of Patent: Dec. 3, 2024

(54) METHOD AND DEVICE FOR CLEANING A CHANNEL USING A DIAPHRAGM PUMP MODULE

(71) Applicant: OTEK ENGINEERING JERZY DOMERACKI, Niemcz (PL)

(72) Inventor: Jerzy Domeracki, Niemcz (PL)

(73) Assignee: OTEK ENGINEERING JERZY DOMERACKI, Niemcz (PL)

( * ) Notice: Subject to any disclaimer, the term of this patent is extended or adjusted under 35 U.S.C. 154(b) by 0 days.

(21) Appl. No.: 18/203,318

(22) Filed: May 30, 2023

(65) Prior Publication Data

US 2023/0302504 A1 Sep. 28, 2023

Related U.S. Application Data

(62) Division of application No. 16/337,655, filed as application No. PCT/EP2018/053821 on Feb. 15, 2018, now Pat. No. 11,697,139.

(30) Foreign Application Priority Data

Feb. 17, 2017 (PL) ........................................ 420573

(51) Int. Cl.
*B08B 9/032* (2006.01)
*F04B 13/02* (2006.01)
(Continued)

(52) U.S. Cl.
CPC ............ *B08B 9/0321* (2013.01); *F04B 13/02* (2013.01); *F04B 43/0736* (2013.01); *F28G 9/00* (2013.01); *F04B 2201/06* (2013.01)

(58) Field of Classification Search
None
See application file for complete search history.

(56) References Cited

U.S. PATENT DOCUMENTS 3,672,791 A 6/1972 Zimmerly
5,482,111 A 1/1996 Bizard
(Continued)

FOREIGN PATENT DOCUMENTS

CN 201302424 Y 9/2009
CN 101554631 10/2009
(Continued)

OTHER PUBLICATIONS

CN101554631 English translation, accessed on Aug. 2024. (Year: 2009).*
(Continued)

*Primary Examiner* — Eric W Golightly
*Assistant Examiner* — Arlyn I Rivera-Cordero
(74) *Attorney, Agent, or Firm* — MOSER TABOADA

(57) ABSTRACT

A method and an apparatus for cleaning a channel, especially a transmission and/or cooling channel, in any type of device, machine, installation, and/or tool, particularly in any type of heat exchanger and/or a molding core, cavity and/or insert is proposed, wherein a channel is cleaned through dynamic, bi-directional pulsation of cleaning medium inside the to-be-cleaned channel, the method being realized by a cleaning apparatus equipped with a diaphragm pump module, plugged either only in the feed side of the transmission line or in the feed side and in the return side, which, after connecting the diaphragm pump module to the external energy source and shutting off the flow control system from the reservoir and the feed pump, allows for putting cleaning medium into a state of two-way dynamic pulsating motion.

6 Claims, 1 Drawing Sheet

(51) Int. Cl.
*F04B 43/073* (2006.01)
*F28G 9/00* (2006.01)

(56) References Cited

U.S. PATENT DOCUMENTS

| | | | |
|---|---|---|---|
| 5,711,921 | A | 1/1998 | Langford |
| 6,082,381 | A | 7/2000 | Kamikawa et al. |
| 2004/0250842 | A1 | 12/2004 | Adams et al. |
| 2009/0095322 | A1 | 4/2009 | Wakao et al. |

FOREIGN PATENT DOCUMENTS

| | | | |
|---|---|---|---|
| CN | 205607239 | U | 9/2016 |
| DE | 29619078 | U1 | 1/1997 |
| DE | 19842668 | A1 | 3/1999 |
| EP | 0631103 | A2 | 12/1994 |
| EP | 0771594 | | 5/1997 |
| EP | 2746751 | A1 | 6/2014 |
| GB | 1383646 | | 2/1974 |
| JP | H07275822 | | 10/1995 |
| JP | 2717627 | B2 | 2/1998 |
| KR | 20130049368 | A | 5/2013 |
| PL | 220379 | B1 | 10/2015 |
| WO | WO-2013167277 | A2 | 11/2013 |
| WO | WO-2015024618 | A1 | 2/2015 |

OTHER PUBLICATIONS

CN201302424 English translation, accessed on Aug. 2024. (Year: 2009).*

International Search Report and Written Opinion mailed Apr. 7, 2018 for PCT Application No. PCT/EP2018/053821, 17 Pages.

* cited by examiner

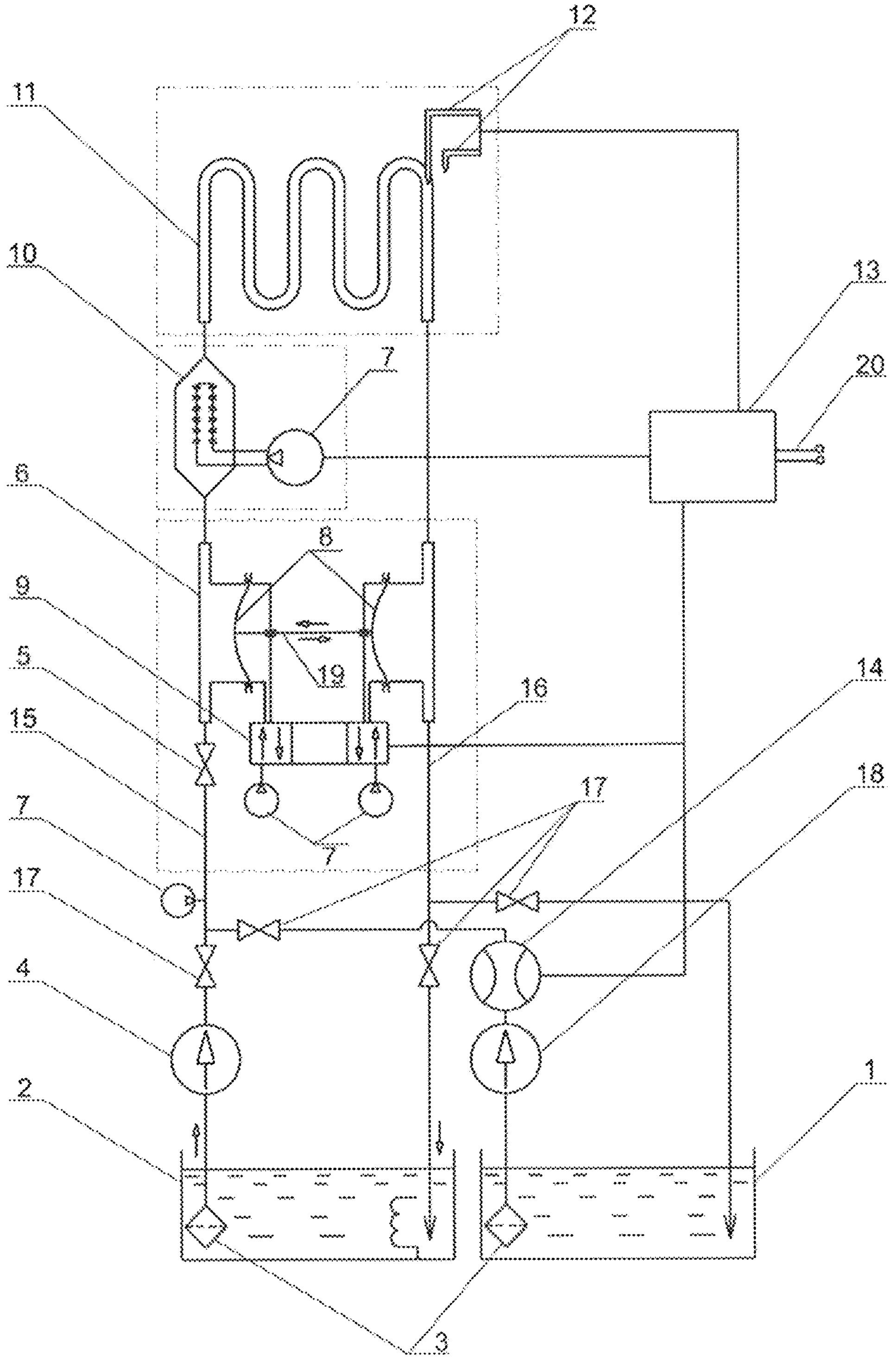
12
11
10
7
13
20
6
8
9
19
5
16
14
15
17
7
7
17
18
4
2
1
3

METHOD AND DEVICE FOR CLEANING A CHANNEL USING A DIAPHRAGM PUMP MODULE

CROSS-REFERENCE TO RELATED APPLICATIONS

This application is a Divisional of co-pending U.S. patent application Ser. No. 16/337,655, filed Mar. 28, 2019, which is the national stage of International Patent Application No. PCT/EP2018/053821, filed Feb. 15, 2018, which claims priority to Poland Patent Application P.420573, filed Feb. 17, 2017, all of which are herein incorporated by reference herein in their entireties.

Aspects of the invention relate to a method and an apparatus for cleaning a channel, especially a transmission and/or cooling channel, in any type of device, machine, installation, and/or tool, particularly in any type of heat exchanger and/or molding core, cavity and/or insert.

TECHNICAL FIELD

There are cleaning and conservation methods for cooling systems where a chemically active cleaning solution with the pH value of 2 required for an effective cleaning process is heated up to an operating temperature of approx. 50° C. (from 30° C. up to the boiling temperature of certain cleaning medium). The cleaning process is carried out by pumping the heated cleaning solution through a channel in order to dissolve scale and/or rust sediment agglomerating on its interior walls. In well-known methods, cleaning is carried out with a single pump, e.g. centrifugal pump, feeding one or several circuits simultaneously and connected in such a way as to automatically change the flow direction of the cleaning medium. The circulation pump delivers the cleaning solution through the connected circuits. Contamination such as scale and/or rust is dissolved and directed back to the reservoir by means of a return line. The cleaning performance is monitored by continuous pH measurement. The actual pH is shown on an actual-value display. At the end of the cleaning phase, a valve unit allows the circulation pump to be switched to the neutralizing fluid reservoir in order to neutralize the leftovers of the residual solution.

More technically advanced devices are equipped with a flow measurement system where the flow meter is installed inside the neutralizing fluid circuit or is plugged into an additional circuit with a high-efficiency circulation pump. By comparing the actual flow rate to the defined one, it is possible to evaluate whether the channels have reached the desired patency reference value and whether the cleaning process is completed. At the end of each stage of operation, the circuits are optionally dried with compressed air. The cleaning process is also enhanced by means of periodic compressed air-blow through channels. However, even these advances systems are difficult to monitor. Moreover, it would be desirable to use the cleaning medium more efficiently, to improve the cleaning effect further, and to reduce the required time for cleaning.

Further, new generation of tools/device components, manufactured with e.g. additive manufacturing or so-called 3d printing, often cannot be maintained well-enough with currently well-known methods due to its high complexity (like single-peace heat exchangers or conformal cooling channels within molding inserts, cores and cavities).

SUMMARY OF THE INVENTION

It is an object of the present invention to reduce the above-described disadvantages at least partially. Aspects and advantages are evident from the claims, the description, and the drawings.

Thus, according to an aspect of the invention, a method and an apparatus are provided for cleaning a channel, especially a transmission and/or cooling channel, in any type of device, machine, installation, and/or tool, particularly in a molding core, cavity, insert and/or any other heat exchanger. Therein a channel is cleaned through dynamic, bi-directional pulsation of cleaning medium inside the to-be-cleaned channel, the method being realized by a cleaning apparatus equipped with a diaphragm pump module (which may also be referred to as a pulsating module) connected with transmission lines in such a way that one pump diaphragm section is plugged in the feed line and the other one in the return line, which, after connecting the two-diaphragm pump to the compressed air source and shutting off the shut-off valve from the reservoir and the feed pump, allows for putting cleaning medium into a state of two-way dynamic pulsating motion.

According to an aspect, the to-be-cleaned channel is connected to the described cleaning apparatus, e.g., by a hose. According to an aspect, between the to-be-cleaned channel and the reservoir, there is a diaphragm pump chamber with a diaphragm arranged within. After cutting off the flow between the diaphragm chamber and reservoir (e.g., with a single valve of any kind, or a set of them), the cleaning medium is put in alternating pulsating motion inside the channel by action of the diaphragm pump module. More specifically, the alternating, pulsating motion of the cleaning medium is actuated by a reciprocal movement of a diaphragm(s) of the diaphragm pump module controlled by an external power source.

In the following, the external energy source is for the sake of brevity referred to as a compressed air/gas source, and the flow control system is referred to as a shut-off valve. However, any other external energy source for actuating the diaphragm pump module, and any other flow control system may be used instead. Further, air (compressed air) is herein used as an example for a gas (compressed gas). Herein, any of the (compressed) air described herein can be substituted by any (other) (compressed) gas such as $CO_2$ or $N_2$ or any other gas (mixture).

According to an aspect of the invention, the channel cleaning method includes forcing the medium situated in a to-be-cleaned channel into a state of dynamic, bi-directional pulsation (alternating pulsating motion inside the channel). The method is realized by means of a modified two-diaphragm pump module whose two diaphragms are preferably coupled mechanically to each other.

According to a preferred aspect, the pump module with a flow control system (e.g., shut-off valve) is fluidly connected in such a way that a (respective) diaphragm pump module is plugged in either one or both of the feed side and the return side. After connecting the diaphragm pump module to the compressed air source and shutting off the shut-off valve from the reservoir and the diaphragm pump module, allows for putting cleaning medium into a state of two-way dynamic pulsation, increasing its turbulent movement and intensifying the cleaning process.

According to a further preferred aspect, at the end of each pulsation phase, the shut-off valve opens and the fresh portion of the chemically active solution is pumped into the cleaned area, while the used liquid returns to the reservoir where it is filtered and mixed with the rest of the solution in the reservoir. The process may be automatic.

According to a further preferred aspect, the cleaning device includes a sensor system for measuring parameters such as medium flow rates and/or temperature. These measurement parameters are monitored to optimize the process. The device can optionally perform intermediate flow rate measurements and define the flow rate growth curve, which allows the device to finish the cleaning process before the appointed time once the user-defined flow rate values are reached, or when the measured flow variations between the subsequent cleaning phases are unnoticeable (below a predetermined threshold).

According to a further preferred aspect, in the case of some kinds of sediment (specific from the properties and chemical composition of a cooling liquids) and/or heavily polluted channels with narrowed diameters due to deposited scale sediment, the cleaning device allows air in the form of microbubbles to be fed into the cleaning medium by means of a micro-diffuser, resulting in a lower density of the cleaning mixture generating lower flow resistance. This aeration module is built-in between the feed pump and a channel input.

According to a further preferred aspect, the cleaning device comprises a heater for heating the cleaning solution to a temperature of about 50° C. (30° C. to up to the boiling temperature of a cleaning medium, e.g., to 70° C.)

According to a further preferred aspect, the effectiveness of the cleaning process is further verified by a temperature control module having temperature sensors on both sides of a cleaned channel's wall. By alternately pumping the heated up cleaning medium and the neutralizing fluid at ambient temperature, or any other two liquids with a significant temperature difference, the controller is enabled to determine the time required to equalize the indications of both temperature sensors, and on basis of the result to determine the thickness of the sediment deposited on the walls of the channel. Based on this information the controller determines whether the cleaning should be continued or finished.

According to a further preferred aspect, the cleaning medium, neutralizing medium or any other liquid (preferably water) or compressed gas, can serve as a diagnostics medium during flow rate and other measurements. Such a data might be used to define the condition and/or pollution level of a channel (11), taken into account for further optimization of the cleaning process and/or other channel (11) maintenance processes.

According to a further preferred aspect, the cleaning device has at least one of the following:

- a first feed line having a first end and a second end (in and out), the second end (out) of the first feed line being adapted to be connected to the first end (in) of the channel by means of a hose with quick-connectors fixed on both ends of the hose.
- a first reservoir (2) containing a cleaning solution, connected to the second end of the first feed line;
- a first feed pump arranged in the first feed line, upstream of the first reservoir and downstream of the first chamber of the diaphragm pump; the first feed pump (feed pump for cleaning solution) being configured to supply the cleaning solution to the channel;
- a shut-off valve arranged in the first feed line, upstream of the first feed pump and downstream of the first chamber of the diaphragm pump module; the shut-off valve being configured to shut-off or at least limit the supply of cleaning solution to the channel;
- a first return line having a first end and a second end, the first end (in) of the first return line being adapted to be connected to the second end of the channel, and the second end of the first return line being optionally connected to the first reservoir. Thereby, a first closed-loop may be formed;
- a filtering device configured to filter the cleaning solution, the filtering device being arranged upstream the first reservoir and downstream the first feed pump.

According to a further preferred aspect, the cleaning device has at least one of the following:

- a second reservoir containing a neutralizing solution;
- a second feed line connected in parallel to the first feed line (e.g., connected to the first feed line downstream of the shut-off valve and upstream of the diaphragm pump module);
- a second return line connected in parallel to the first return line, (e.g., connected downstream of the second diaphragm chamber of the diaphragm pump module);
- a second pump (feed pump for neutralizing medium) arranged in the second closed-loop, the second pump being configured to supply the neutralizing solution to the channel;
- a measuring device for measuring the flow of the neutralizing solution, the measuring device being arranged in the second feed line;
- a filtering device configured to filter the neutralizing solution, the filtering device being arranged on the second feed line, upstream the second reservoir and downstream the second feed pump, and/or on the second return line, upstream the second reservoir.

Thereby a second closed-loop parallel to the first closed loop (or partially parallel to and partially overlapping with the first closed loop) may be formed.

According to a further aspect, a method of cleaning a (e.g. transmission or cooling) channel comprises (wherein each of steps d to h are optional):

a) connecting a channel to the apparatus as described herein;
b) supplying the cleaning solution to the channel;
c) shutting-off a shut-off valve of said apparatus and subjecting the cleaning solution to a (turbulent) alternating pulsating motion using the diaphragm pump module;
d) drying the channel with compressed air coming from a compressed air source
e) supplying the neutralizing solution to the channel;
f) measuring the flow rate of the neutralizing solution and comparing it with a standard/predetermined flow rate value;
g) drying the channel with compressed air coming from a compressed air source
h) optionally, repeating the above steps depending on an outcome of the measurement.

According to a further aspect, a method and an apparatus for cleaning a channel, especially a transmission and/or cooling channel in any type of device, machine, installation, and/or tool, particularly in any type of heat exchanger and/or a molding core, cavity and/or insert are provided. Therein, a channel is cleaned through dynamic, bi-directional pulsation of cleaning medium inside the to-be-cleaned channel, the method being realized by a cleaning apparatus equipped with a diaphragm pump module, plugged either only in the feed side of the transmission line or in the feed side and in the return side, which, after connecting the diaphragm pump module to the external energy source and shutting off the flow control system from the reservoir and the feed pump, allows for putting cleaning medium into a state of two-way dynamic pulsating motion.

According to an aspect, inside the cleaning apparatus, between the to-be-cleaned channel (11) and a reservoir (2), there is a diaphragm chamber (diaphragm pump chamber) with an elastic diaphragm. After cutting off the flow between the diaphragm chamber and reservoir (either with a single valve of any kind, or set of them), the diaphragm is actuated for putting the cleaning medium in alternating pulsating motion inside the channel (11). More specifically, the alternating, pulsation motion of the cleaning medium, is actuated by a reciprocal movement of a diaphragm/-s.

According to a further aspect, the method of cleaning a channel includes

1. Supplying a cleaning medium from a reservoir to an inside of the channel to be cleaned (e.g., by pumping the cleaning medium into the channel (11) with a feed pump);
2. Cutting off or at least limiting the flow between the reservoir and the diaphragm pump chamber (to be more specific, the flow is limited so that it cannot flow back to the reservoir, e.g., by a cutoff valve(s) upstream or downstream the feed pump (4));
3. Putting the cleaning medium in a reciprocal movement inside the channel by the at least one diaphragm pump module;
4. Optionally, pumping a fresh portion of cleaning medium into the channel and repeating the process, i.e. going back to step 1.

According to aspects of the invention, this method can be carried out effectively for both single and multiple channels (connected in series or in parallel) simultaneously and is dependent on the number of sections installed in the device.

Potential advantages of aspects of the invention include a change of a static, laminar flow of the chemically active solution in channels into a dynamic process, resulting in increased cleaning medium effectiveness and shortened cleaning time. For a multi-section device designed for simultaneous cleaning of channels with different cross-sections, a dedicated pulsation module in each section enables similar removal conditions for sediments and guarantees high efficiency of the process.

In addition, the use of the fluid aeration micro-diffuser reduces flow resistance, which is especially useful in some kinds of sediment and/or heavily scaled channels with a small clearance. Constant process control by measuring the time needed to equal temperatures at the inner and outer sides of a channel makes it possible to diagnose the actual efficiency of a cleaned cooling system as well as determine its current thermal conductivity initially reduced by the stone sediment deposited on channel's walls.

The diaphragm pump module can be provided with one single diaphragm pump chamber, so that the pumping action is applied only to one side (active side) of the channel. Thereby a reciprocal motion of the cleaning medium in the channel is possible. However, a more effective cleaning is possible by providing the diaphragm pump module as a two-diaphragm pump module having two diaphragm pump chambers each having a respective diaphragm arranged therein. The two diaphragms may be mechanically coupled to each other, e.g. by a pin, or they may not be directly coupled. In the latter case the coordinated motion of both diaphragm pump chambers may be ensured by an actuator adapted for opposite operation of both diaphragms (i.e., one diaphragm is operated to create overpressure when the other diaphragm is operated to create underpressure, and vice versa).

Herein, a diaphragm pump module is defined by comprising a chamber with an elastic diaphragm, the diaphragm being movable/deformable to change the volume and thus pressure in the chamber. The diaphragm pump or diaphragm pump module does not necessarily comprise a check valve. Therefore, the diaphragm pump module may also be referred to as a pulsator.

BRIEF DESCRIPTION OF THE FIGURE

The FIGURE describes schematics of the system with a cleaning device according to an embodiment of the invention.

DETAILED DESCRIPTION OF AN EMBODIMENT

The following is a description of a preferred embodiment of a cleaning device and method. It is understood that any of the specific descriptions of this embodiment is not limiting but is merely an example. For example, while the example describes a two-diaphragm pump, also one of the two diaphragm pump modules can be omitted, so that the reciprocal motion is effected by the remaining single diaphragm pump module.

According to a preferred embodiment of the invention, the method of cleaning of transmission channels includes three stages. These stages are illustrated with reference to the FIGURE, but are not limited to the embodiment shown in the FIGURE.

In a first cleaning phase, the cleaning medium with $pH<=2$ at about 50° C., being a mixture of water and the cleaning agent, is pumped from a reservoir (2) into a channel (11) by means of a pump (4) with a 25 l/m flow rate. During the first cleaning cycle, the medium is pumped into the channel for 40 seconds, whereas subsequent cycles last 15 seconds.

After filling the channel (11) with cleaning medium, the shut-off valve (5) closes and the two-diaphragm pump (6) is actuated with diaphragm (8), which alternately aspirate and pump the cleaning medium into the cut off channel, as a result of which the medium is put in a state of dynamic pulsation and turbulent motion within the channel. After the pulsating rinsing phase, the shut-off valve opens and the cleaning medium is pumped out of the channel (11) into the reservoir (2) where, after being filtered through the filter (3), it is mixed with the fresh solution and then, by means of the feed pump (4), the cleaning medium is sucked back into the channel in the next cleaning cycle.

In the case of heavily polluted channels with low throughput, the cleaning fluid is additionally aerated by compressed air in the form of air-bubbles by means of the micro-diffuser (10) positioned inside the feed line (15) close to the exit of the cleaning system. Looped exchange of cleaning medium and subsequent repetition of the cleaning process is carried out until the required flow rates have been reached or the results do not differ between the individual cleaning phases. The process is automatic and is operated by the PLC controller (13) which, based on the measurement data from the flowmeter (14), analyzes the flow difference between subsequent cleaning phases. Independent pollution level diagnosis is realized by monitoring the time required for temperature equalization, measured by two temperature sensors (12), one measuring the medium temperature in channel (11) and the other measuring temperature on the outside of the channel (11). Temperature sensors (12) are connected to the operating control system (13) that compares the reference thermal conductivity of a given channel with a currently determined one and decides on the cleaning process end or its continuation.

The method is implemented by means of the device shown in the accompanying FIGURE, which is described in the following.

The device includes a neutralizing medium reservoir (1), a cleaning medium reservoir (2), filters (3), a feed pump (4), a shut-off valve (5), a two-diaphragm pump (6) with diaphragms (8), compressed air sources (7), air valves controlling a diaphragm pump (9), a micro-diffusor (10), a cleaned channel (11), temperature sensors (12), an operating-control module (13), a flow meter (14), feed lines (15), return lines (16), additional flow control valves (17), a feed pump for neutralizing medium (18), a diaphragm connecting pin (19), power supply (20).

Thus, the FIGURE illustrates a general aspect of the invention, which is summarized in the following using the reference signs of the FIGURE: A device for cleaning of transmission channels of e.g. liquids, and cooling channels of all equipment types, machines, installations, tools, especially molding cavities, which has fluid reservoirs: with active cleaning medium (2), and neutralizing medium (1), a feed pump (4, 18), valves (5, 17) integrated into the system and connected by means of transmission lines (15, 16), and an additional pump (6) that is built into the system behind the feed pump (4) and the shut-off valve (5), the pump (6) being devoid of check valves and equipped with two Teflon rubber diaphragms (8) mechanically connected by means of a pin (19), located at the inlet and outlet of a cleaned channel, one of which is built into the feed line (15) and the other into the return line (16), and/or has a micro-bubble diffuser (10), built into the feed line (15) at the output of the system, in front of the channel (11), connected to the compressed air source (7), aerating cleaning medium entering the channel (11), and/or has a diagnostics module consisting of two temperature sensors (12), one of which being located within the channel (11) and the other one being located as close as possible to the outer wall of the cleaned channel (11), both sensors being connected to the control module (13) analyzing measurement data.

While the above example has been described with a compressed air supply for actuating the diaphragms, any other external power supply may be used instead, e.g., other gases, fluids, springs, magnets, pistons and others. Furthermore, while a single shut-off valve has been described for cutting off the flow, e.g., between diaphragm chamber and reservoir, the invention is not limited to this.

EXAMPLE

The method according to an embodiment of the present invention is illustrated more closely by the following example of execution.

The process starts with filling the reservoir (1) with a mixture of water and neutralizing medium for passivation of the cleaning solution inside the channels after the cleaning process. Reservoir (2) is filled with a cleaning solution consisting of a mixture of water and a chemically active cleaning agent pH<=2, then heated in reservoir (2) to about 50° C.

After connecting the device to the channel (11) by means of the transmission lines (15, 16), a tightness and patency test is performed. If the test is successful, the machine performs the measurement of flow rates, using the ultrasonic flow meter (14). The neutralizing medium in the Reservoir (1) is pumped into the channel (11) for (1) minute by means of a second feed pump (18) at a pressure of 1-6 bar. The flow rate measurement data from the ultrasonic flow meter (14) is stored and analyzed by the controller PLC (13) and the channel (11) is dried by compressed air from the compressed air source (7).

Once the diagnostics stage is completed, the device automatically moves on to the proper cleaning process. The feed pump (4) pumps the cleaning medium into the channel (11) for 1-3 min at a pressure of 1-6 bar (depending on the diameter and length of the channel). After filling the channel (11) with the cleaning medium, the system is cut off by a shut-off valve (5) and then the two-diaphragm pump (6), with Teflon rubber diaphragms (8) located on the input and output sides of the cleaned channel and mechanically connected with each other by means of the pin (19), is activated. Diaphragms (8) perform a pulsating movement alternately pushing the cleaning medium backward and forwards in the closed loop of the channel (11), as a result of which the medium is put in a state of dynamic pulsation and turbulent motion within the channel (11). The diaphragms' operating speed is defined by the operating control module (13). In the case of heavily contaminated channels the micro-diffusor (10) by means of the source of compressed air (7) injects air micro-bubbles into the cleaning medium, constituting between 1% and 60% of the overall pumped medium volume, which results in a lower density of the medium mixture.

At the end of the channel pulsation cleaning cycle the shut-off valve opens and the medium is pushed by means of the feed pump (4) into the Reservoir (2), where it is filtered by means of the filter unit (3) and then is re-pumped into the system. After the cleaning phase of channel (11) is completed, the channel is dried by compressed air and the diagnostic test is performed again to verify the efficiency of the cleaning process. The cleaning/diagnostics processes are repeated until the differences in flow rates between subsequent cleaning steps are lower than 3% or the user's defined flow rate is reached. In parallel, independent diagnostics of contamination level is being carried out by monitoring the time needed to even out the temperatures indicated by the two temperature sensors (12). The sensors are positioned so as to measure the medium temperature inside the channel (11) and the temperature outside of channel (11). Sensors (12) data is read by the operating control module (13), which computes and compares the reference thermal conductivity of a given channel with currently measured results and then decides whether the cleaning process should be finished or continued. Upon completion of the cleaning and the final diagnostics process, channel (11) is dried with compressed air.

Finally, some further embodiments are described. These embodiments can be combined with any other embodiment or aspect described herein. Reference signs, referring to the FIGURE, are purely illustrational but not limiting.

According to a first embodiment, a method of cleaning of transmission and cooling channels in all types of devices, machines, installations, tools, especially molding cavities, characterized in that the active chemical solution filling the cleaned channel (11) is put into dynamic bi-directional pulsation by means of a module with a two-diaphragm pump (6) with a shut-off valve (5), both connected in such a way that the cleaned channel is inserted between two diaphragms (8) coupled mechanically by means of the pin (19), which, after connecting the pump to the compressed air source (7)

and cutting off the loop from the reservoir (2) and the feed pump (4) with the shut-off valve (5), results in putting the cleaning medium in alternating pulsating motion inside the channel (11).

According to a second embodiment, the method of cleaning of transmission and cooling channels in all types of equipment, machines, installations, tools, especially molding cavities, characterized in that the cleaning medium, while being pumped into the cleaned channel (11), is aerated with micro-bubbles by means of a diffuser (10) integrated into the feed line (15) at the system output, powered with compressed air from the compressed air source (7), thereby decreasing the density of the mixture and reducing the fluid flow resistance, the amount of air being fed depending on the degree of patency of the channel and varying from 1% to 60% of the volume of the pumped medium.

According to a third embodiment, the method of cleaning of transmission and cooling channels in all types of devices, machines, installations, tools, especially molding cavities, characterized in that the measurement of the cleaning process is carried out by determining the time needed for equalization of temperatures indicated by two temperature sensors (12), one of which measures medium temperature in the channel (11) and the second one measures temperature on the outer side of the channel, this measurement being made at the end of cleaning with heated chemical solution and just before the start of neutralization with cool neutralizing medium and transferring this information to the operating control unit 13, which allows for comparison of the result to the nominal value.

According to a fourth embodiment, the device for cleaning transmission channels of e.g. liquids, and cooling channels in all types of equipment, machines, installations, tools, especially molding cavities, containing fluid reservoirs, a pump, valves built into the system and connected by means of transmission lines, characterized in that it has a two-diaphragm pump (6), built into the system behind the feed pump (4) and the shut-off valve (5), the pump (6) devoid of check valves, one of the pump diaphragms being built into the feed line (15) and the other into the return line (16), and/or has a micro-bubble diffuser (10) built into the feed line (15) at the output of the system and connected to the compressed air source (7) that aerates the fluid, and/or has a diagnostic module consisting of two temperature sensors (12), where one sensor is located within the channel (11) and the other sensor is as close as possible to the outer wall of the cleaner channel (11), both connected to the control module (13).

The invention claimed is:

1. A system comprising a cooling channel and a device for cleaning the cooling channel, the device comprising:

a diaphragm pump module having at least one diaphragm pump chamber having a diaphragm arranged therein, the at least one diaphragm pump chamber being configured for direct connection to the cooling channel without any check valve between the at least one diaphragm pump chamber and the cooling channel; and a drive unit for actuating the diaphragm pump module for generating reciprocal motion of the diaphragm, thereby putting a cleaning medium in alternating bi-directional pulsating motion inside the cooling channel, wherein the cooling channel is fluidly connected to the at least one diaphragm pump chamber, the at least one diaphragm pump chamber feeding a cooling channel input and/or output, wherein the diaphragm pump module is configured to connect to the cooling channel in a closed loop, and wherein the bi-directional pulsating motion of the cleaning medium is not restricted by a check valve;

a feed pump; and a shut-off valve, wherein one of the at least one diaphragm pump chamber of the diaphragm pump module is provided in a feed line connecting a reservoir to the cooling channel and comprising the feed pump and the shut-off valve on a reservoir side of the diaphragm pump module, and another one of the at least one diaphragm pump chamber is provided in a return line from the cooling channel.

2. The system of claim 1, wherein the diaphragm pump module is devoid of any check valve.

3. The system of claim 1, wherein the at least one diaphragm chamber is adapted to be connected to the cooling channel such that the diaphragm chamber is placed between the cooling channel and the reservoir.

4. The system of claim 1, wherein the diaphragm pump module is a two-diaphragm pump module having two diaphragm pump chambers each having a respective diaphragm arranged therein, the two diaphragm pump chambers being adapted to be connected to the cooling channel such that the cooling channel extends between the two diaphragm pump chambers, and wherein the drive unit is configured for generating coordinated reciprocal motion of the diaphragms, thereby putting the cleaning medium in alternating pulsating motion inside the cooling channel.

5. The system of claim 4, wherein the two diaphragms are mechanically coupled to each other.

6. The system of claim 4, wherein the two diaphragms are mechanically coupled to each other with a pin.

* * * * *